Oct. 28, 1952 — F. DANIELS — 2,616,051
THERMOLUMINESCENCE RADIATION EXPOSURE METER
Filed May 31, 1949
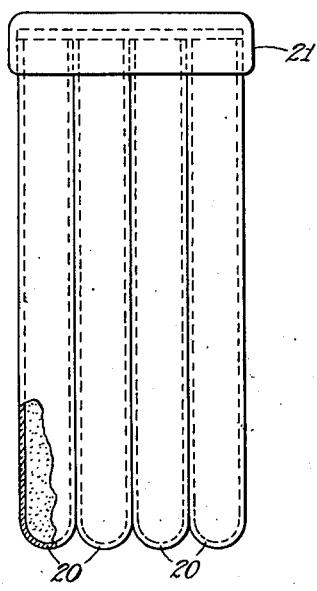
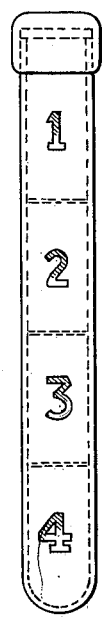
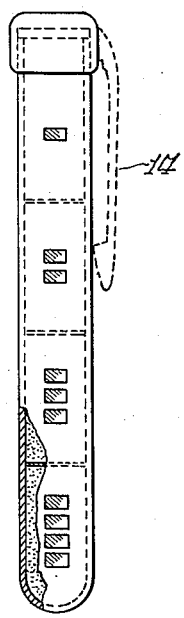
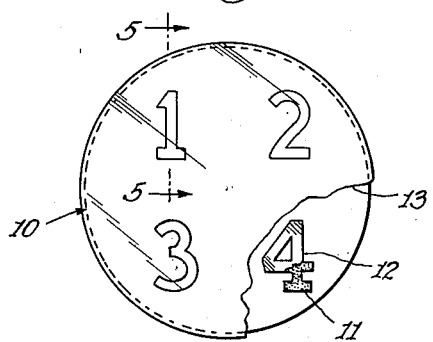
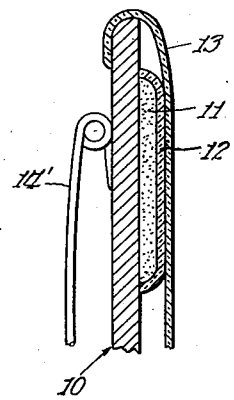
Inventor
Farrington Daniels.
By Soans, Pond & Anderson
Attys Patented Oct. 28, 1952

2,616,051

UNITED STATES PATENT OFFICE 2,616,051

THERMOLUMINESCENCE RADIATION EXPOSURE METER

Farrington Daniels, Madison, Wis., assignor to Wisconsin Alumni Research Foundation, Madison, Wis., a corporation of Wisconsin Application May 31, 1949, Serial No. 96,317

5 Claims. (Cl. 250—83)

The invention described herein may be manufactured and used by or for the Government for governmental purposes without the payment of any royalty thereon.

The present invention is directed to an improved radiation exposure meter and includes within its scope an improved method of detecting, measuring, and evaluating radiations, including X-rays, nuclear radiations, etc.

The effect on animals, including humans, when over-exposed to radiations such as X-rays, neutrons and the like is well known. See Pollard and Davidson, Applied Nuclear Physics, pages 160–169, John Wiley & Sons Inc., New York, N. Y. (1942). They range from "sunburn" or skin erythema to severe burns, and genetic changes to blood changes which may result in death. In view of this, all atomic energy laboratories require means of recording the amount of radioactivity exposure of the workers. Means for recording radioactivity exposure is also needed for workers engaged in cancer research with radioactive materials, as well as for all workers employed in the X-ray field such as hospital X-ray laboratories and the like.

Up to the time of the present invention, the usual means employed to detect and measure exposure to radiations were (1) photographic films and (2) electrical devices. Recording means of these two types, while generally satisfactory, have, nevertheless, been found to possess distinct disadvantages for determining the amount of radioactivity exposure of workers subject to radiations. Photographic films, for example, have proven objectionable due to the time required to develop the films and when the films show exposure, due to the additional time required to compare the exposed film, using a densitometer, with the original film in order to attempt to ascertain the degree of exposure. This results in delay which may be of the essence. Photographic films have also proven not to be suitable for accurately recording amounts of intense exposures or high dosages. In addition, the use of films has also proven relatively expensive due to the equipment and labor involved in processing, coupled with the fact that they can not be reused after developing.

Electrical devices such as the Lauritsen electroscope and Geiger-Müller counter used to a considerable extent heretofore, while satisfactory for certain purposes, are objectionable as they are not adapted for recording or measuring cumulative radioactivity exposures of workers. They are also rather intricate devices and have proven to be relatively expensive means for recording radiation activities. The Geiger counters in particular, while satisfactory for use by the experts, are not particularly adaptable for use in the hands of the unskilled such as may be needed by civilians in time of atomic warfare. The urgent need for a simple, inexpensive means for recording cumulative radioactivity exposure and the rapid determination of the amount of the exposure has been recognized. See in this connection pages 47 and 143 of the recent book by Ralph E. Lapp, entitled "Must We Hide," Addison-Wesley Press, Cambridge, Mass.

The principal object of the present invention is to provide a simple and inexpensive radiation exposure meter.

Another object of the present invention is to provide a simple and inexpensive means for recording cumulative radioactivity exposures.

Another object of the present invention is to provide means for recording both low and high dosages of radioactivity exposure and means for rapidly determining the amount of the exposure.

Still other objects of the present invention are to provide a radiation exposure meter that is capable of being reused, and that is adaptable for use by the unskilled as well as the skilled in the radiation art.

An additional object of the present invention is to provide an improved method of detecting, measuring and evaluating radiations.

Other objects of the present invention will be apparent as the description proceeds hereinafter.

When substances in the crystalline state such as minerals, salts, etc., are exposed to a sufficient amount of X-rays or radioactivity and then heated, they exhibit a type of luminescence which is called "thermoluminescense." The luminescence is caused by the thermo release of electrons from traps or positions of "metastability" and their return to the parent ions. See Daniels, Saunders and Boyd, "Science," 109, page 440, April 29, 1949. The present invention utilizes this phenomenon and is based upon the discovery that different substances require different amounts of radiation before exhibiting detectable thermoluminescence and that the difference in "thermoluminescence-radiation thresholds" may be employed as a means for detecting, measuring and evaluating radiations. In the present specification and claims, the amount of radiation, X-ray, radioactivity, etc. exposure required before a substance exhibits detectable thermoluminescence is termed the thermoluminescence-radiation threshold of the substance.

The thermoluminescence-radiation threshold may be readily determined by experimental test. A satisfactory and simple way to make this determination is to expose portions of the substance under test to various dosages of X-ray radiations, and then heat the irradiated portions and observe which portion or portions exhibit thermoluminescence. The lowest radiation which causes the substance to exhibit thermoluminescence is the thermoluminescence-radiation threshold of the substance. In place of X-rays any particle, quanta or electromagnetic radiation may be employed to obtain the thermoluminescence-radiation threshold, although the substances should be calibrated against the type of radiations to be tested, i. e. similar radiations should be used to obtain the relative thresholds between different substances or materials.

When a substance with a predetermined thermoluminescence-radiation threshold is exposed to an undetermined amount of radiation and is then heated, the amount of radiation may be readily evaluated by observing the effect of the heating in respect of luminescence, and comparing the effect with a known standard. For example, if the irradiated substance, on the one hand, does not exhibit thermoluminescence on heating, the exposure is below the predetermined thermoluminescence-radiation threshold, and if the irradiated substance, on the other hand, does exhibit thermoluminescence on heating, the exposure is at least as great as the predetermined thermoluminescence-radiation threshold. While a single substance may serve as such as an exposure meter, the preferred exposure meters of the present invention employ a combination of substances with different predetermined thermoluminescence-radiation thresholds. An illustrative example is an exposure meter having four substances, one of which is very sensitive and exhibits thermoluminescence when exposed to low dosages, another of which is less sensitive and exhibits thermoluminescence when exposed to medium-low dosages, another of which is still less sensitive and exhibits thermoluminescence when exposed to medium or approaching dangerous dosages, and the other of which exhibits thermoluminescence at high dosages known to be dangerous or at dosages now known to be lethal. With such a combination having "stepwise" predetermined thermoluminescence-radiation thresholds, it is possible to detect slight radiations and measure or evaluate higher exposures over a desired wide range, e. g. from $\frac{1}{10}$ or less to 1000 Roentgen units or equivalent radiations.

To determine whether the substance exhibits thermoluminescence, the substance after exposure to radiation is heated above 100° C. and below dull red heat or about 600° C. The heating range generally used is about 150–450 C. with about 200° C. being preferred. The heat may be supplied from any source such as electricity, gas, alcohol lamps and the like, although where available it is preferred to employ an electric furnace, electric hot plate or the like where the temperature may be readily controlled within the preferred heating range. A simple electric heating coil connected to a battery is adaptable for field as well as laboratory use. The test is preferably carried out in an ordinary dark room where the presence or absence of thermoluminescence may be readily observed. Where a dark room is not available, as may be the case in field use, a light-tight enclosure (dark box) provided with heating means and observaiton slits may be employed.

The following example will serve to illustrate the present invention.

*Example*

Composition:

| | Thermoluminescence-radiation threshold |
|---|---|
| A—NaCl+1 mole per cent AgI | 2500 |
| B—NaCl+10 mole per cent NaBr | 800 |
| C—NaCl | 200 |
| D—NaBr | 50 |

The thresholds shown above, while arbitrary units, show the ratio of radiation necessary before the compositions exhibit thermoluminescence, i. e. detectable luminescence. For composition A it was found that an exposure of two minutes to X-ray (35 kv.-copper target with 10 milliamperes plate current) was adequate to make the sodium chloride-silver iodide mixture exhibit intense thermoluminescence. For composition B it was found that about three times the same type of radiation was required before the sodium chloride-sodium bromide mixture exhibited intense thermoluminescence. For composition C it was found that about four times the same type of radiation required for composition B was required before the pure sodium chloride exhibited intense thermoluminescence, and for composition D it was found that four times the same type of radiation required for composition C was required before the pure sodium bromide exhibited intense thermoluminescence. With this stepwise combination, it is possible to determine whether the exposure has been less than, equivalent to or greater than the radiations necessary to make compositions A, B and C exhibit thermoluminescence, and less than or equivalent to the radiations necessary to make composition D exhibit thermoluminescence. Where the recording of higher radiations is desired, certain limestones may be used as some types of limestone require over fifty times the radiation required for the most sensitive sodium chloride-silver iodide composition A shown above before they exhibit intense thermoluminescence.

In place of the salts employed in the above example, any heat stable substance or combination of substances having the property when heated of becoming luminescent after having been previously subjected to radiations may be employed. The substances, as well as the amounts of radiation required before the substances exhibit thermoluminescence, may be readily determined by simple experimental test as described above. Examples of preferred substances in the crystalline state are as follows: alkali and alkaline earth metal halides, e. g. sodium chloride, potassium bromide, lithium fluoride, calcium bromide, etc., and various mixtures of the same; and minerals such as natural limestone, granite, fluorite, quartz, topaz, etc., as well as materials such as glass. Mixtures of minerals and minerals and salts may also be employed. Where minerals such as certain limestones exhibit some thermoluminescence as obtained in the natural state, the original thermoluminescence should be destroyed before use by heating until the limestone or other mineral no longer exhibits thermoluminescence.

In the drawings:

Fig. 1 is an elevational view of a radiation exposure meter embodying various of the features of the invention;

Fig. 2 is an elevational view of a modified exposure meter;

Fig. 3 is a side view of another modified exposure meter;

Fig. 4 is a plan view of a badge which is adapted to be used as an exposure meter; and Fig. 5 is a sectional view taken on line 5—5 of Fig. 4.

The radiation exposure meters of the present invention may be made up in various shapes and forms. An example is a transparent carrier or container, e. g. a small glass tube, filled with a single substance having a predetermined thermoluminescence-radiation threshold or preferably a plurality of transparent tubes filled with different substances having different predetermined thermoluminescence-radiation thresholds. As shown in Fig. 1, the plurality of tubes 20 may be advantageously attached to a holder or mounting 21. Where separate tubes or other carriers are employed, they should be adjacent in the sense that they will be exposed to substantially the same radiations. One preferred form of exposure meter is a single tube in effect divided into sections, as for example by glass discs or the like, each section of which contains a substance with different, i. e. step-wise, predetermined thermoluminescence-radiation thresholds. In this type of meter shown in Figs. 2 and 3 and which may be of the "fountain pen" type provided with a clip 14, at least a portion of the tube of each section is transparent to visible light, e. g. glass, transparent thermostable plastic, etc. The different sections may be marked with opaque different numbers or different numbers of dots or dashes as shown in Figures 2 and 3, or the transparent portions where the rest of the tube is opaque, may be in the form of different symbols as illustrated, so that the particular sections exhibiting thermoluminescence on heating may be readily identified.

The exposure meters may also be made up of single large crystals or slabs of minerals as for example limestone, granite, etc., or a heat resistant slab or slabs with the substances or single crystals of the substances imbedded in the slab or slabs. One of the preferred meters of this general type is in the form of a badge, disc or tag divided into a plurality of sections, e. g. thirds, quarters, fifths, etc., each section having a different substance applied thereto of different, i. e. step-wise, predetermined thermoluminescence-radiation thresholds. The substances may be applied as single crystals imbedded in the badge, disc or tag although it is generally preferred to use powdered crystals which are held on a plate or metal carrier or backing by waterglass or other thermostable adhesive or coating. The crystals also may be applied to each section in the form of different marks or numbers, e. g. 1, 2, 3 and 4 as shown in Fig. 4 so that the particular sections or quarters exhibiting thermoluminescence on heating may be readily identified. In Fig. 5 which is a cross-section of a badge shown in Fig. 4, 10 represents the carrier or backing and 11 represents the thermoluminescent composition which is held on the carrier by adhesive 12. The coated face of the badge is also provided with a transparent protective member 13 such as glass or thermostable transparent plastic. As shown in Figs. 3 and 5, the meters may be attached to the body being exposed by clips 14 and 14'. If desired, in order to facilitate heating, e. g. on a hot plate, or where the transparent protective cover is not thermostable, the badge may be fabricated so that clip 14' and protective member 13 are removable. Other forms of meters made up of various combinations of substances of different thermoluminescence-radiation thresholds may also be employed.

In operation, in order to detect whether the meter has been exposed to radiation and if exposed to radiation determine the amount of exposure, it is merely necessary to heat the meter and observe the luminescence. A person, for example, wearing a meter of the type shown in Figs. 2 or 3 or a badge shown in Fig. 4 who desires to determine the amount of radiation, if any, to which he has been exposed, merely heats the meter and observes which of the substances constituting the meter exhibits thermoluminescence. If the substance with the low thermoluminescence-radiation threshold luminesces and the substance with a higher threshold does not luminesce, he knows that he has been exposed to radiations above the threshold of one substance and below the threshold of the other substance.

Where desired, the amount of radiation that a substance has been exposed to over and above the thermoluminescence-radiation threshold may be ascertained by matching the light or glow emitted during thermoluminescence of a particular substance exposed to an unknown amount of radiation with the light emitted during thermoluminescence of the same substance exposed to similar and known amounts of radiations. This is possible as the intensity (glow) of the luminescence increases with increased radiation. In place of matching the intensity of the visible light or glow emitted during the thermoluminescence of the substance exposed to the unknown amount of radiation with the intensity of visible light produced by the same substance when exposed to known radiation, the glow of the substance exposed to the unknown radiation may be matched with a standardized light from another source. A flashlight, for example, may be used with different filters permitting the passage of light of standardized intensities. A resistance wire which emits light or glows at variable standardized intensities as the electric current is varied may also be used. In this case, the glow of the wire and current are calibrated with the glow produced during thermoluminescence of the substance under test at known radiation exposures, and the amount of the unknown radiation is determined directly by the current required to match the wire glow with the glow of the substance during thermoluminescence.

The glow or intensity of the visible light produced by thermoluminescence may also be determined by focusing the light upon a photoelectric cell, the voltage produced in such cell being balanced against the voltage of a standard cell with a potentiometer or the like. The required balancing voltage may then be compared with the balancing voltages required for the same substance when exposed to standardized radiation.

The intensity of thermoluminescence may also be measured if desired by light meters. A lens focusing the luminescence on a photoelectric cell connected with a recording galvanometer such as shown in the copending application of Charles A. Boyd and Joseph Hirschfelder, Serial No. 96,338 filed May 31, 1949 has been found satisfactory.

The modification described above for determining the amount of radiation above the threshold may be used with any of the radiation exposure meters. It is particularly adaptable for use where a large salt crystal or crystals or slab or slabs of minerals are used as the meter.

The exposure meters of the present invention are simple and inexpensive and are readily adaptable for use by the unskilled as well as the skilled in the radiation art. They also may be readily prepared for reuse by merely heating the meter under the substances no longer thermoluminesce. The meters also provide means for recording both low and high dosages, along with rapid means for determining the amount of exposure. They are in addition very sensitive and are particularly adaptable for recording cumulative exposures where the radiations per se are relatively minute. The present invention provides an overall, improved practical method of detecting, measuring and evaluating radiations of the type desired.

I claim:

1. A radiation exposure indicator comprising, in combination, a carrier, a plurality of materials having different predetermined thermoluminescence-radiation thresholds, and means for supporting said materials on said carrier, each of said plurality of materials being separated from each of the other of said plurality of materials whereby the effect of radiation on each of the materials may be observed.

2. A radiation exposure indicator comprising, in combination, a container, means for dividing said container into a plurality of sections, a plurality of materials having different predetermined thermoluminescence-radiation thresholds, one of said materials being placed in each of a plurality of said sections, and at least a portion of said container being transparent to visible light whereby the thermoluminescent properties of each of said materials may be observed.

3. A radiation exposure indicator comprising, in combination, a container, means for dividing said container into a plurality of sections, a plurality of materials having different predetermined thermoluminescence-radiation thresholds, one of said materials being placed in each of a plurality of said sections, portions of said container in communication with each of a plurality of said sections being transparent to visible light, each of said transparent portions being formed in the shape of identifying marks to facilitate the determination of exposure to radiation, and means for attaching said container to the body being exposed to radiation.

4. A radiation exposure indicator comprising, in combination, a carrier plate, a plurality of materials having different thermoluminescence-radiation thresholds, said materials being attached to said plate in spaced apart relation by a thermo-resistant adhesive, said materials being formed into identifying marks to facilitate the determination of exposure to radiation, and means for attaching said plate to the body being exposed to radiation.

5. A method for detecting and measuring radiation that a substance has been exposed to over and above the thermoluminescence-radiation threshold which comprises, exposing the substance to the radiation to be detected and measured, heating said irradiated substance, and comparing the intensity of the light produced during thermoluminescence with the intensity of the light produced during the thermoluminescence of the same substance exposed to similar and known amounts of radiation.

FARRINGTON DANIELS.

REFERENCES CITED

The following references are of record in the file of this patent:

UNITED STATES PATENTS

| Number | Name | Date |
| --- | --- | --- |
| 2,074,226 | Kunz et al. | Mar. 16, 1937 |
| 2,225,044 | George | Dec. 17, 1940 |
| 2,496,218 | Kieffer | Jan. 31, 1950 |